(12) United States Patent
Laurence et al.

(10) Patent No.: US 8,750,569 B2
(45) Date of Patent: Jun. 10, 2014

(54) AUTOMATED CRYSTAL IDENTIFICATION ACHIEVED VIA MODIFIABLE TEMPLATES

(75) Inventors: Thomas Laurence, North Royalton, OH (US); Sharon X. Wang, Highland Heights, OH (US); Jerome J. Griesmer, Mentor, OH (US)

(73) Assignee: Koninklijke Philips N.V., Eindhoven (NL)

( * ) Notice: Subject to any disclaimer, the term of this patent is extended or adjusted under 35 U.S.C. 154(b) by 58 days.

(21) Appl. No.: 13/702,150

(22) PCT Filed: Apr. 27, 2011

(86) PCT No.: PCT/IB2011/051837
§ 371 (c)(1),
(2), (4) Date: Dec. 5, 2012

(87) PCT Pub. No.: WO2011/158134
PCT Pub. Date: Dec. 22, 2011

(65) Prior Publication Data
US 2013/0077827 A1 Mar. 28, 2013

Related U.S. Application Data

(60) Provisional application No. 61/354,912, filed on Jun. 15, 2010.

(51) Int. Cl.
*G06K 9/00* (2006.01)
*G01V 5/12* (2006.01)
(52) U.S. Cl.
USPC .......................... 382/103; 382/274; 250/269.3
(58) Field of Classification Search
CPC .................. G06K 9/00; G01V 5/12
USPC ......... 382/100, 103, 106–107, 128–134, 154, 382/162, 168, 173, 181, 232, 254, 274, 276, 382/286, 299, 305, 312; 250/363.9, 363.3, 250/362, 252.1, 269.3; 378/4, 21
See application file for complete search history.

(56) References Cited

U.S. PATENT DOCUMENTS 5,444,253 A 8/1995 Berlad
6,288,399 B1 9/2001 Andreaco et al.
(Continued)

OTHER PUBLICATIONS

Chaudhari, A. J., et al.; Crystal identification in positron emission tomography using nonrigid registration to a Fourier-based template; 2008; Phys. Med. Biol.; 53:5011-5027.

(Continued)

*Primary Examiner* — Seyed Azarian

(57) ABSTRACT

A nuclear imaging system (10) includes a crystal identification system (40) which receives a flood image (30) which includes a plurality of peaks, each peak responsive to radiation detected by a corresponding scintillator crystal. A crystal identification processor (42) partitions the flood image (30) into a plurality of regions (56), each region being masked to correspond to one of an array of nuclear detectors. A model image (62) is generated in which the at least one Gaussian models represents the identified peaks. Misidentified peaks in the model image (62) in which locations of the peaks in the flood image (30) differ from the corresponding scintillator crystal are determined and the locations of the misidentified peaks in the flood image (30) are corrected. A calibration processor (43) corrects geometric distortions in acquired projection data according to the corrected peaks.

20 Claims, 7 Drawing Sheets

(56) References Cited

U.S. PATENT DOCUMENTS

| | | | |
|---|---|---|---|
| 6,710,349 B2* | 3/2004 | Shao | 250/363.03 |
| 7,232,990 B2* | 6/2007 | Wang et al. | 250/252.1 |
| 7,335,889 B2 | 2/2008 | Wang et al. | |
| 7,368,721 B2 | 5/2008 | Wang et al. | |
| 7,449,680 B2 | 11/2008 | Wang et al. | |
| 7,953,265 B2* | 5/2011 | Sirohey et al. | 382/131 |
| 2005/0061983 A1 | 3/2005 | Stonger et al. | |
| 2006/0011847 A1* | 1/2006 | Wang et al. | 250/363.09 |
| 2008/0050000 A1* | 2/2008 | Blaffert et al. | 382/131 |
| 2010/0038546 A1* | 2/2010 | Schulz | 250/362 |

OTHER PUBLICATIONS

Chaudhari, A. J., et al.; Spatial distortion correction and crystal identification for positron-sensitive avalanche photodiode-based PET scanners; 2008; IEEE Nuclear Science Symposium Conference; pp. 5045-5052.

Park, S. K., et al.; A software package for the semi-automated crystal identification and spectrum analysis in multi-layer DOI PET systems; 2009; J. Nucl. Med.; 50 (Supplement 2)1537.

Stonger, K. A., et al.; Optimal Calibration of PET Crystal Position Maps Using Gaussian Mixture Models; 2004; IEEE Trans. on Nuclear Science; 51(1)85-90.

* cited by examiner

AUTOMATED CRYSTAL IDENTIFICATION ACHIEVED VIA MODIFIABLE TEMPLATES

CROSS. REFERENCE TO RELATED APPLICATIONS

This application is a national filing of PCT application Serial No. PCT/IB2011/051837, filed Apr. 27, 2011, published as WO 2011/158134 A2 on Dec. 22, 2011, which claims the benefit of U.S. provisional application Ser. No. 61/354,912 filed Jun. 15, 2010, which is incorporated herein by reference.

The present application relates to nuclear imaging systems. It finds particular application in conjunction with positron emission tomography (PET) detectors, more particularly, pixelated scintillators with solid-state sensors.

In positron emission tomography (PET), the radioactive decay events of the radiopharmaceutical produce positrons. Each positron interacts with an electron to produce a positron-electron annihilation event that emits two oppositely directed gamma rays. Using coincidence detection circuitry, a ring array of radiation detectors surrounding the imaging patient detect the coincident oppositely directed gamma ray events corresponding to the positron-electron annihilation. A line of response (LOR) connecting the two coincident detections contains the position of the positron-electron annihilation event. Such lines of response are analogous to projection data and can be reconstructed to produce a two- or three-dimensional image. In time-of-flight PET (TOF-PET), the small time difference between the detection of the two coincident γ ray events is used to localize the annihilation event along the LOR (line of response).

Modern PET imaging systems include a scintillator layer and an array of photomultiplier tubes (PMTs) with an optical coupling layer disposed therebetween. Gamma ray events interact with the scintillation layer, which in turn produces a scintillation of a flash which produces a plurality of light photons. The photons from the scintillation crystal are detected by the PMTs, which output signals proportional to the energy of the incident gamma ray. Anger logic is used to analyze the output signals to determine the location of each scintillation on the scintillation layer. In general, each scintillation event is detected by more than one PMT. Based on the relative amplitude of the scintillation photons, the coordinates of each scintillation event are determined.

To improve resolution of PET imaging systems, pixelated scintillators have been introduced which include an array optically isolated scintillator crystals. A detector ring is approximately 90 cm in diameter and 15-25 cm wide. Instead of a few to several large block scintillators affixed to one another to form the interior layer of the detector ring, a pixelated scintillator is made of thousands of tightly packed scintillator crystals which measure approximately $2 \times 2$ mm$^2$ to $4 \times 4$ mm$^2$. Each scintillator crystal is optically isolated from one another by a thin reflector sheet to reduce cross talk between adjacent pixels. Anger logic is still employed with pixelated scintillators to determine the coordinates of scintillation events. However, since Anger logic relies on a single scintillation event being detected by multiple detectors to localize a radiation event, geometric distortions are introduced towards the edges, known as edge compression, because the number of detectors available at the edges is limited. Generally, detection at the center of the detector ring is much more accurate than towards the edges.

For accurate image reconstruction, attributes such as energy resolution, timing resolution, light collection, or the like need to be measured for each crystal because individual crystals can have varying characteristics in addition to variations between detectors. These variations result in irregularities between the calculated radiation event and the exact position where the scintillation event occurred. The measured attributes are used to calibrate the system to ensure optimal spatial resolution and sensitivity.

Current calibration techniques involve irradiating the detector array with an annihilation flood source to generate a flood image. The flood image is a two-dimensional distribution of the detected events, where each peak corresponds to a single crystal in the pixelated scintillator. For non-pixelated systems, or block detector systems, a pin-hole mask is used to cover the scintillator blocks to generate the 2D distribution of detected events. A calibration map is generated from the flood image to map the position of calculated radiation events to the actual position of the corresponding scintillator crystal. The calibration map is used to remove any geometric distortions in acquired image data. Generating the calibration map relies heavily on manual intervention, which can take up to eight hours for a skilled technician to complete. There exists a need for an automated method and corresponding system to reduce the calibration time of nuclear imaging systems.

The present application provides a new and improved crystal identification system and method which overcomes the above-referenced problems and others.

In accordance with one aspect, a method for automated crystal identification in nuclear imaging systems is presented. A flood image is generated which includes a plurality of peaks, each peak responsive to received radiation and each peak corresponding to a corresponding scintillator crystal. The flood image is partitioned into a plurality of regions, each region being masked to correspond to one of an array of nuclear detectors. At least one Gaussian model is fitted to each peak and a model image is generated in which the fitted Gaussian models represent the identified peaks. Misidentified peaks in the model image in which locations of the peaks in the flood image differ from the corresponding scintillator crystal are determined and the location of the misidentified peaks in the flood image are corrected based on global knowledge of all peaks and local knowledge of neighboring peaks in the model image.

In accordance with another aspect, a crystal identification system is presented. The crystal identification system includes an image memory which receives a flood image which includes a plurality of peaks, each peak responsive to radiation detected by a corresponding scintillator crystal. The crystal identification processor is configured to partition the flood image into a plurality of regions, each region being masked to correspond to one of an array of nuclear detectors. Then, at least one Gaussian model is fitted to each peak. A model image is generated in which the fitted Gaussian models represent the identified peaks. Misidentified peaks in the model image in which locations of the peaks in the flood image differ from the corresponding scintillator crystal are determined and the location of the misidentified peaks in the flood image are corrected based on global knowledge of all peaks and local knowledge of neighboring peaks in the model image.

In accordance with another aspect, a nuclear imaging system is presented. The nuclear imaging system includes an array of radiation detectors oriented about an examination region to receive radiation from a radiopharmaceutical injected into a subject. A coincidence detector detects pairs of detected radiation events and determines projection data corresponding to the coincident pairs. A calibration processor corrects geometric distortions in the acquired projection data using the crystal identification system and a reconstruction processor reconstructs the corrected projection data into an image representation.

One advantage resides in that calibration time and cost is reduced.

Another advantage resides in that geometric distortions in nuclear imaging data are reduced.

Another advantage is that the method requires little or no manual intervention.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 1 diagrammatically illustrates a nuclear imaging system with a crystal identification system;

Figure 6:
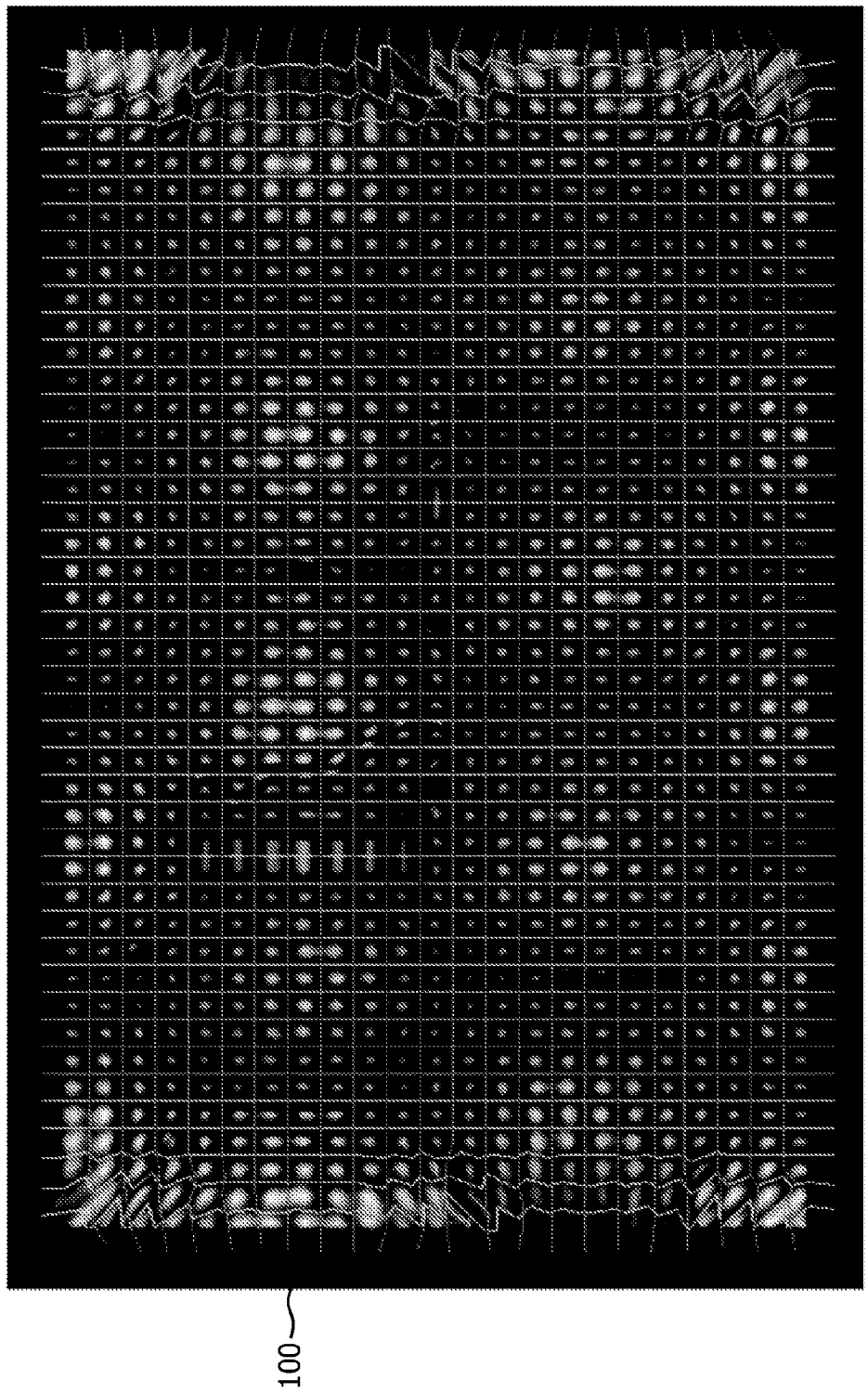
Figure 7:
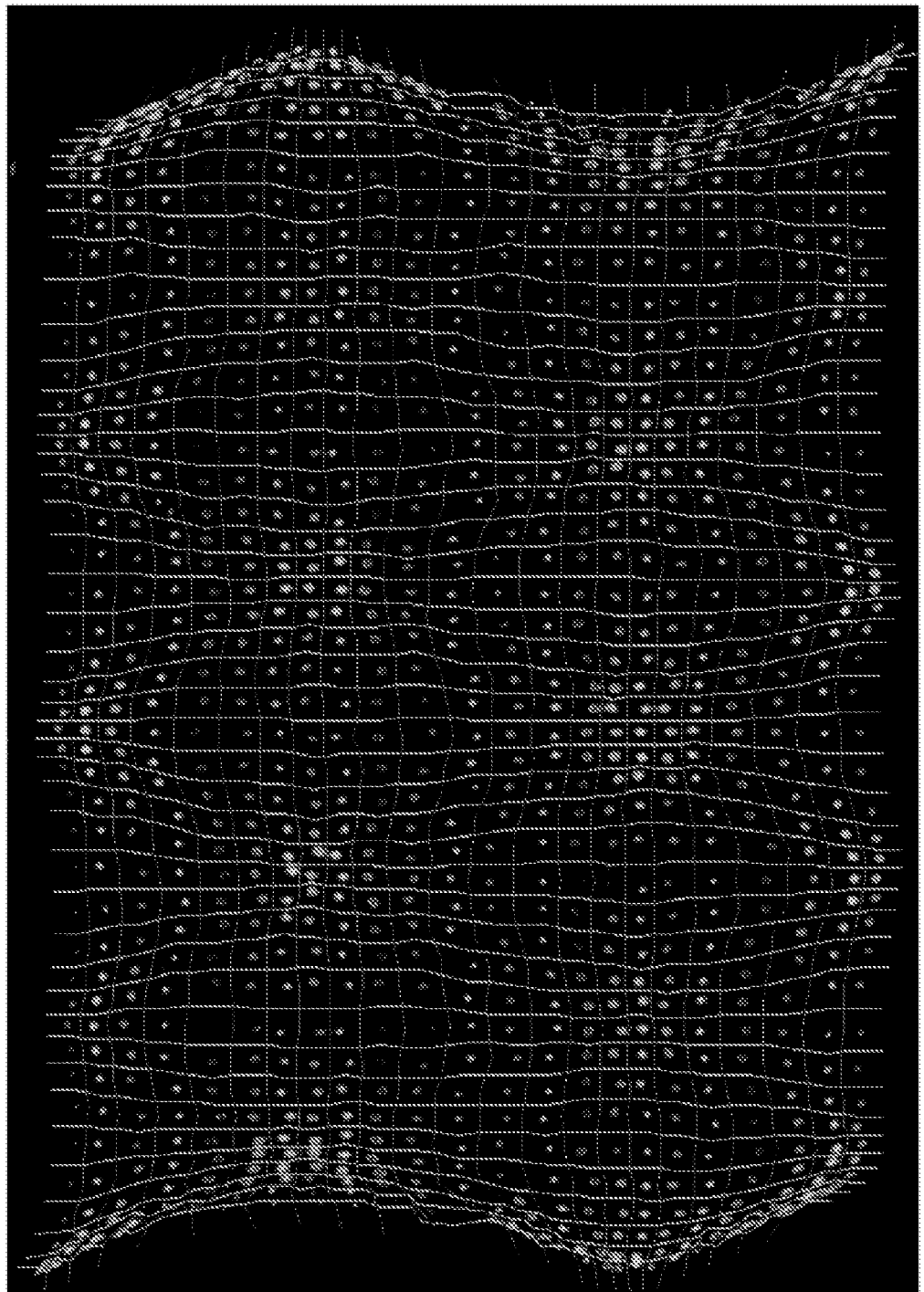

FIG. 6 a rectangular space deformation of the model image;

FIG. 7 is a calibration map with crystal boundaries identified; and

Figure 8:
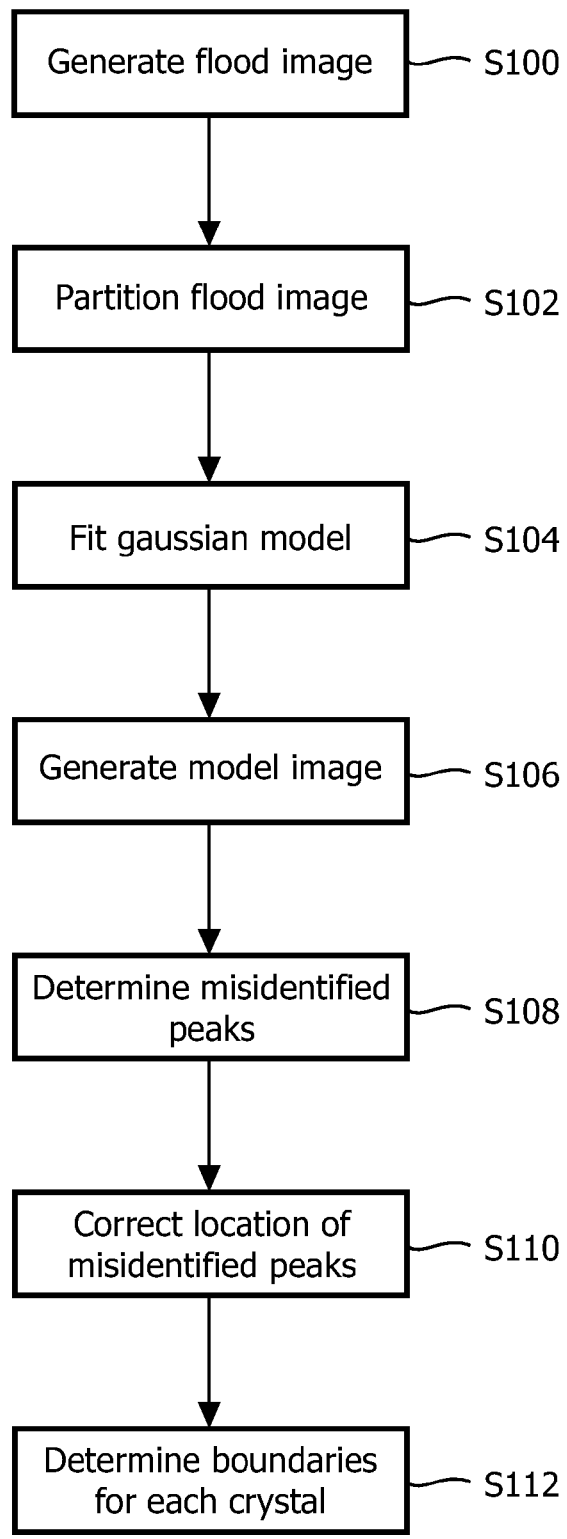

FIG. 8 is a flow chart of a method for determining crystal boundaries.

Figure 1:
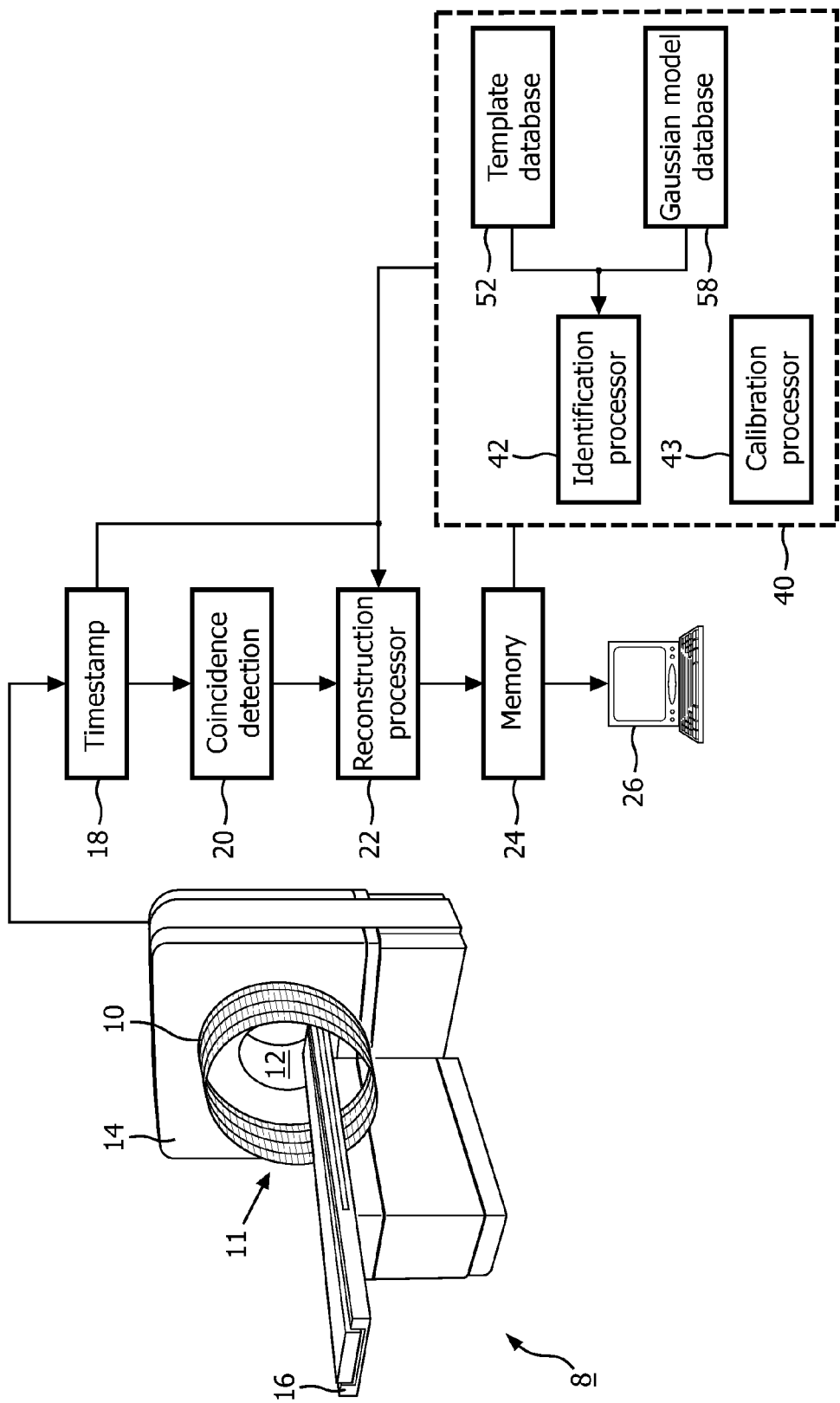

With reference to FIG. 1, a nuclear imaging system, such as a SPECT scanner, a PET scanner, or other radiation tomography scanner 8, includes a plurality of radiation detectors 10 oriented to receive radiation from an imaging region 12. In FIG. 1, the radiation detector modules 10 are arranged in several adjacent rings along an axial direction; however, other arrangements of radiation detector modules can be used. Moreover, it is to be appreciated that the plurality of radiation detector modules 10 arranged in an array 11 is diagrammatically illustrated; typically the radiation detector array 11 is housed within a housing 14 of the tomography scanner 8 and thus are not visible from the outside. Each radiation detector module 10 includes a pixelated scintillator layer and a radiation detector, such as a photomultiplier tube (PMT) or the like, with an optical coupling layer disposed therebetween. The tomography scanner 8 includes a subject support 16 for positioning a subject or a human patient in the imaging region 12. Optionally, the support 16 is linearly movable in the axial direction generally transverse to the rings of the radiation detector modules 10 to facilitate acquisition of three-dimensional imaging data over an extended axial distance.

During an imaging procedure, a patient on the support 16 is injected with a radiopharmaceutical. Radiation events are detected by the radiation detector modules 10. A time stamp is associated with each sensed scintillation event by a time stamp circuit 18. In a PET scanner, a coincidence detector 20 determines coincident pairs and the LOR defined by each coincident pair. A reconstruction processor 22 reconstructs the LORs into an image representation which is stored in an image memory 24. In a TOF-PET system, the reconstruction processor also derives time-of-flight information for each LOR from the time-stamp circuit 18. A graphic user interface or display device 26 includes a user input device which a clinician can use to select scanning sequences and protocols, display image data, and the like.

Due to inconsistencies between individual scintillator crystals and between individual PMTs, such as inaccuracies introduced during manufacturing, each PET imaging system is calibrated to account for geometric distortions which may arise from these inconsistencies. The results ensure that each calculated radiation event is associated to the scintillator crystal location at which the scintillation actually occurred. Furthermore, because of the nature of reconstruction algorithms, such as Anger logic or the like, used by the reconstruction processor 22, the distribution of detected radiation events at the edges of the radiation detector ring are highly compressed and vary largely from one detector module 10 to another. The PMTs tend to pull the apparent location of scintillation events towards the center of the PMT. Once the camera has been calibrated, the output signals from the PMTs will gradually change or drift over time and use. Eventually the drift will distort the output such that the system should again be re-calibrated. The initial calibration and regular re-calibrations can be time-consuming and costly to the consumer. An automatic crystal identification system can reduce the time of a skilled technician to perform a calibration procedure from 8-10 hours to less than an hour providing a significant cost savings in both labor and scanner down time.

Figure 2:
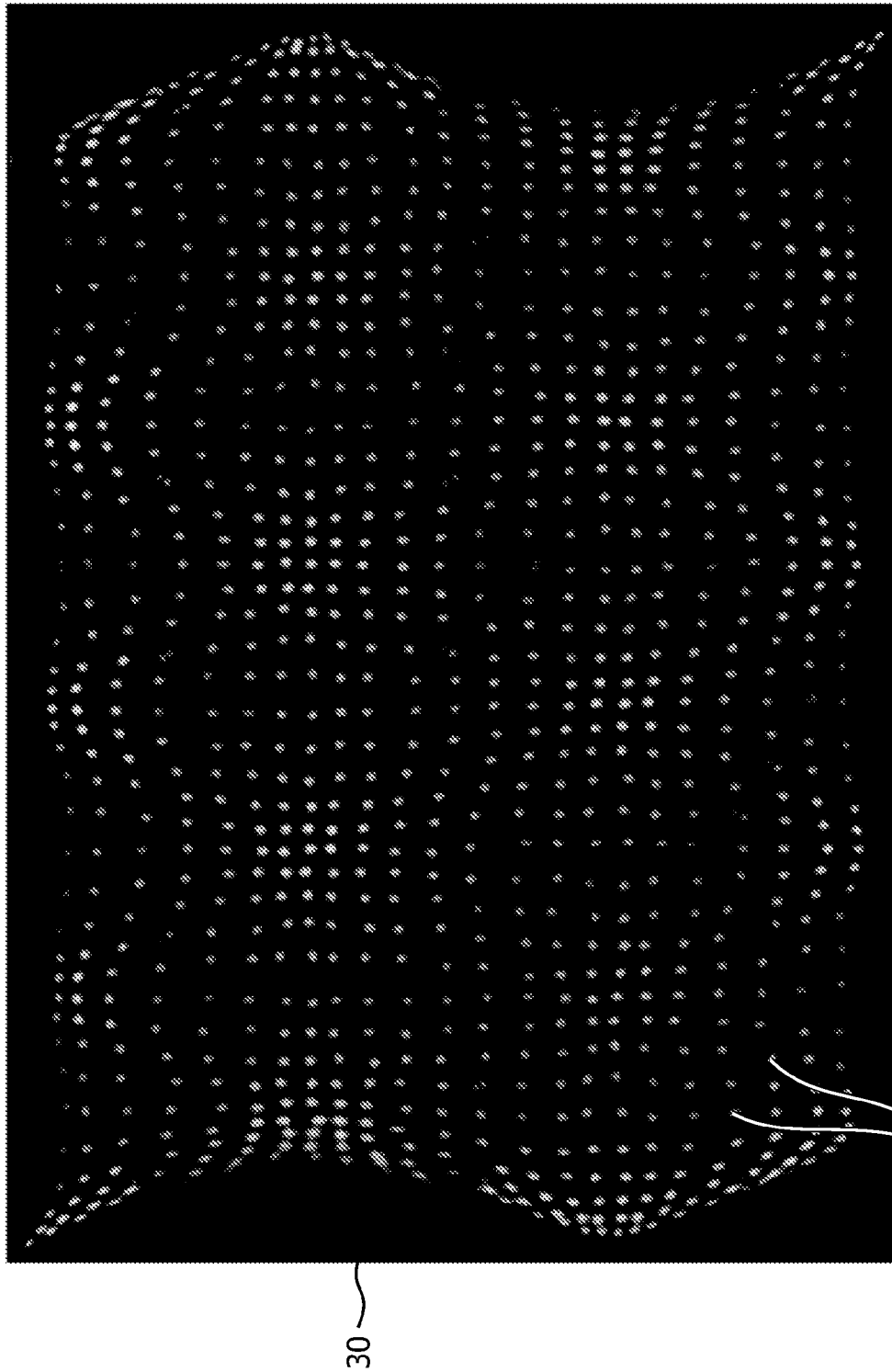
FIG. 2 illustrates a flood image.

To calibrate the PET scanner 8, a point or line source is placed into the imaging region such that the radiation detector modules 10 are uniformly flooded with radiation events. When the flood data is reconstruction, the result is a flood image 30, as illustrated in FIG. 2, which is a two-dimensional distribution of horizontal and vertical locations (i.e. rows and columns) of detected radiation events. Each scintillation peak 32 in the flood image 30 corresponds to an individual scintillator crystal in the pixelated scintillator. The generated flood image is stored on an image memory 24 which is accessible by a crystal identification system 40 for further analysis. For scanners with a continuous or block rather than pixelated scintillator, a lead plate with a rectangular array of apertures is placed over each detector module. As seen in FIG. 2, the square grid of scintillator crystals (or template apertures), is distorted in the flood image.

Figure 3:
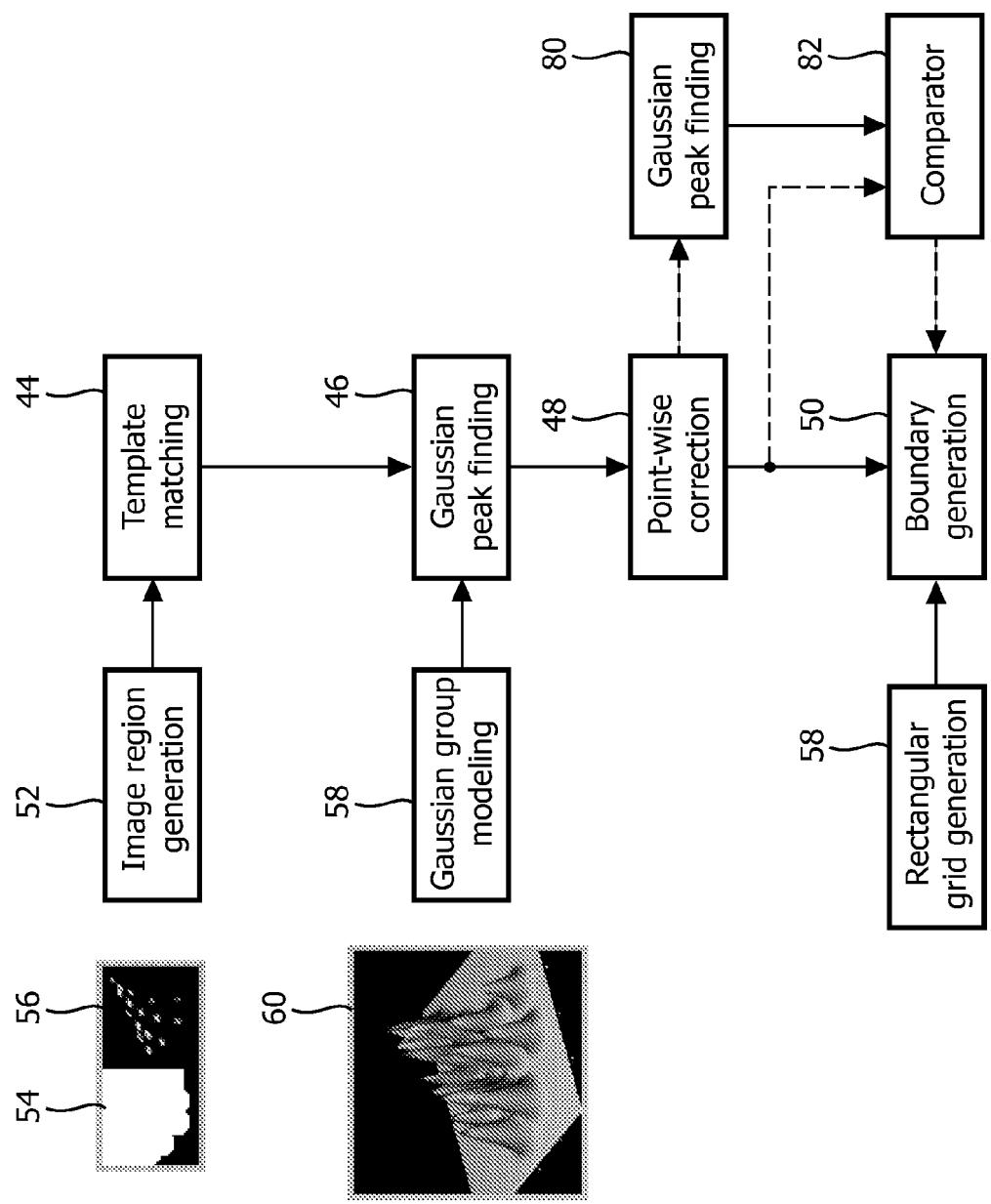
FIG. 3 is a flow chart of a method for identifying crystal locations and boundaries in nuclear imaging systems.

With reference to FIG. 1, the crystal (or template aperture) identification system 40 includes an identification processor 42 or computer routine which processes the flood image (FIG. 2, 30) to identify and determine the image location corresponding to each individual scintillator crystal. A calibration processor 43 or computer routine corrects geometric distortions in acquired projection data based on the determined image locations of the scintillator crystals. The identification processor 42 determines an initial location, i.e. row and column, for each peak (FIG. 2, 32) which is corrected to the actual scintillator crystal or template aperture location using a template matching technique (FIG. 3, 44), a Gaussian surface fitting technique (FIG. 3, 46), and a point-wise correction (FIG. 3, 48). From the corrected locations of each scintillator peak (FIG. 2, 32), a boundary map is generated (FIG. 3, 50) which identifies the boundary for each scintillator crystal and is used to remove geometric distortions by the calibration processor 43.

As previously noted, each PET imaging module includes approximately 10-30 PMTs which are optically coupled to the hundreds-thousands of scintillator crystals. Since each PMT exhibits varying imaging qualities, the scintillation peaks which correspond to each individual PMT are identified. The identification processor 42 partitions or divides the flood image 30 is into regions (hexagonal in FIG. 2) which correspond to each individual PMT using template matching. A database 52 or library of templates and masks is generated off-line using a priori knowledge pertaining to previous calibration parameters, known PMT and scintillator characteristics, or the like. Each region is masked with a corresponding mask and then compared to the templates of the template database according to an optimization technique, such as least squares minimization or the like. In the illustrated embodiment, the highlighted corner of the flood image 30 is multiplied by a mask 54 and the resulting masked region is shown in 56 upon which the optimizations are performed. In a least square implementation, the identification processor 42 performs a pair of optimizations as show in equations 1 and 2:

$$\min_{i,\theta}\{\min_x\{(f-g)^2\}\} \quad \text{equation 1}$$

where $$x=\{x_0,y_0,l_{x1},l_{x2},l_{y1},l_{y2}\} \quad \text{equation 2}$$

f is the masked region, g is the template, x is the deformation parameter space, i is the template index, and θ is a set of rotations. The first (nested) optimization is a least squares minimization between the masked region f and the indexed template g. The region f is translate or shifted according to translation parameters $x_0$, $y_0$ and stretched or warped with scaling factors $l_{x1}$, $l_{x2}$, $l_{y1}$, $l_{y2}$ along the positive and negative x- and y-axes, respectively. The second optimization is a discrete optimization which rotates the templates according to a rotation factor θ. The identification processor 42 iterates through the entire library 52 of templates and selects the best match based on the optimizations. Alternatively, to save computer time, the identification processor 42 may select the first template that falls within an acceptable range. The goal is to determine deformation parameters x along with the rotation θ which are used to correct the initial peak locations. It should be appreciated that other optimization and/or matching techniques are also contemplated.

Figure 4:
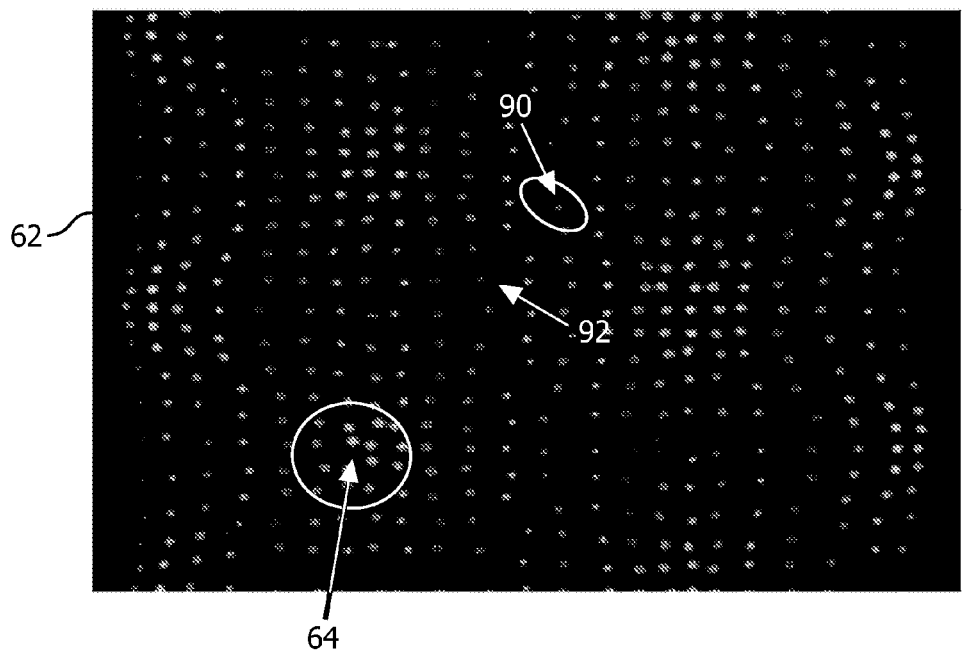
FIG. 4 is a model image with crystal locations corrected from the flood image.

The peak locations are further refined using a Gaussian surface fitting technique. Each scintillation peak in a selected masked region 56 is fitted with a Gaussian surface model. A database 58 of Gaussian peak models is generated off-line and is available to the identification processor 42. The identification processor 42 fits at least one Gaussian model to each scintillator peak 32 at the corrected location from the template matching step 44. The fitting is accomplished using an optimization technique such as a least squares minimization or the like. The fitted Gaussian models together form a surface image representation 60 of the masked region 56. The local maximum or the peak of each fitted Gaussian model is determined and replaces the current corrected locations from the previous template matching step 44. The results of the Gaussian peak finding step is a model image 62, as illustrated in FIG. 4, which is a composite of the individual surface images 60. In regions where peaks are highly compressed, i.e. in close proximity to one another, the initial localization of the peaks may falsely identify two or more peaks that overlap as a single, connected peak 64. The Gaussian peak finding step 46 enables recognition of these connected peaks by comparing each peak distribution with a Gaussian surface model.

Figure 5:
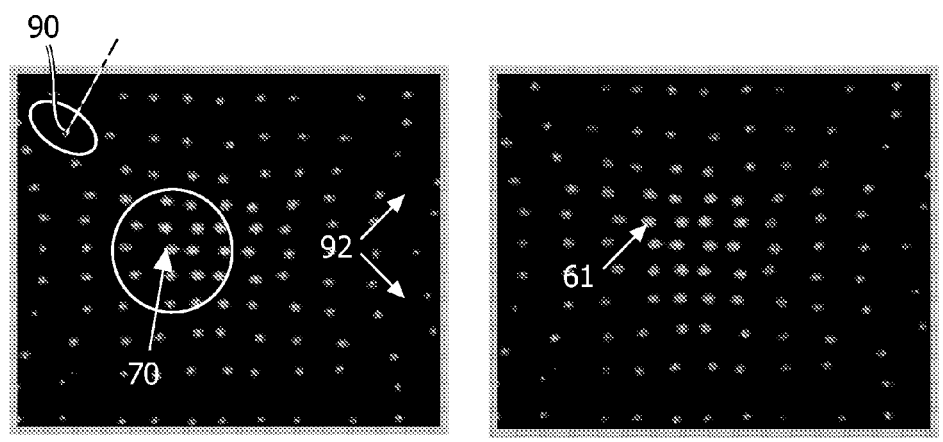
FIG. 5 illustrates examples of connected peaks, split peaks, and PMT boundaries in the model image.

With reference to FIGS. 3 and 5, a point-wise correction step 48 is performed on each of corrected peak locations, i.e. those determined in the previous Gaussian peak finding step 46, to determine which peaks are misallocated to a wrong scintillator crystal. Since the template matching step 44 does not account for individual scintillator crystal misallocations, the point-wise correction 48 scans through the peak locations to determine misidentified peaks which correspond to a different scintillator crystal than expected. The identification processor 42 uses the coordinate location of corrected peaks to measure the distance between adjacent peaks. If the measured distance of a selected peak 70 does not fall within a global or preselected range of distances, i.e. not too close yet not too far, to a peak in a bordering row or column, then the processor 42 samples a local neighborhood 72 of surrounding peaks and determines the mean distance between adjacent peaks in the neighborhood. If yet again the measured distance under inspection does not fall within an acceptable range based on the mean distance of the neighboring peaks, the identification processor 42 then determines an expected location 74 according to the mean distance of the neighborhood sample. In one embodiment, the identification processor 42 uses a priori knowledge such as average peak distances from previously stored calibration parameters in addition to the neighborhood mean distance. The corrected peak locations are updated with the determined expected locations 74. In another embodiment, after the point-wise correction step 48, the Gaussian surface fitting step is repeated 80 and the results are compared 82 and the best results are used to update the corrected peak locations which will be used in the subsequent boundary generation step 48.

Conversely to the problem of connected peaks 64, split peaks 90 can occur when the identification processor 42 falsely identifies a single peak as two distinct peaks corresponding to separate scintillator crystals. Dark bands, seen in both the model image 62 and the flood image 30, form a hexagon pattern where each hexagon represents an imaging area of a single detector module 10. An interface 92 forms between adjacent PMTs which is visualized as the dark bands. Split peaks 90 occur when two PMTs share a single scintillator crystal. When a radiation event is detected at an interface, it is detected by both PMTs 10 and thus two peaks are generated which represent the same radiation event. The point wise correction step 48 identifies each split peak 90 based at least one of two criteria: the split peak 90 location relative to an interface 92 and/or the direction of the two or more Gaussians models which have been fitted to the split peak 90 in step 46. An interface template which maps of the locations of PMT interfaces 92 is used to flag peaks located on or near the interfaces 92. If a flagged peak is a split peak 90, then a center point, i.e. mid-point between the peaks, is used to identify the location of the corresponding scintillator crystal.

At this point, all of the scintillator crystal locations have been determined and corrected by the identification processor 42. The corrected crystal locations approximate the centroid of the crystal and not the boundaries. The location of scintillator crystal centers, represented by the peaks, alone do not provide enough degrees of freedom to make boundary lines around each crystal accurately without cutting into an adjacent crystal, especially at the edge crystals which undergo compression. To address this problem, the model image 62 is mapped into a rectangular space 90 where the model image is deformed to an equal spaced Cartesian coordinate system as shown in FIG. 6. The rectangular space is deformation invariant, thus the crystal shapes are approximately the same. The boundaries are determined in the rectangular space and then mapped backed to the model image space using a transformation, such as nonlinear warping or the like, as shown in FIG. 7, to generate a calibration map 92. The calibration map 92 is used to correct for geometric distortions in projection data during imaging procedures or it be used as a priori knowledge for future calibration procedures.

A method for crystal identification, according to FIG. 8, determines the image location of scintillation events corresponding to each individual scintillator crystal. The method begins with generating the flood image 30 (S100), from a point or line source, which includes the two-dimensional distribution of detected radiation events. The generated flood image 30 is partitioned (S102) into a plurality of regions using a template matching technique. Each of the regions corresponds to one of the plurality of nuclear detectors arranged about the examination region 12. To further refine the peak locations from the previous step, each peak in a selected masked region 56 is fitted with a Gaussian surface model (S104). The local maximum of each fitted peak is determined and used to replace, i.e. represent, the peak locations from the previous step which are then used to generate a model image 62 (S106). A point-wise correction is performed on the model image 62 to determine misidentified peaks (S108), i.e. peaks incorrectly allocated to a scintillator crystal, and to correct the misidentified peaks (S110) according to one of global knowledge of the all peaks and/or local knowledge of neighboring peaks. Boundaries for each scintillator crystal are determined (S112) from the corrected model image. A boundary is placed equidistant between adjacent Gaussian models from the model image. From the boundary image, a nuclear imaging system can be calibrated.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for crystal identification in nuclear imaging systems, comprising:
    generating a flood image which includes a plurality of peaks, each peak responsive to received radiation, each peak corresponding to a corresponding scintillator crystal;
    partitioning the flood image into a plurality of regions, each region being masked to correspond to one of an array of nuclear detectors;
    fitting at least one Gaussian model to each peak;
    generating a model image in which the fitted Gaussian models represent the identified peaks;
    determining misidentified peaks in the model image in which locations of the peaks in the flood image differ from the corresponding scintillator crystal; and
    correcting the location of the misidentified peaks in the flood image based on at least one of (i) global knowledge of all peaks and (ii) local knowledge of neighboring peaks in the model image.

2. The method according to claim 1, wherein a local maximum for each fitted Gaussian model defines the location of the corresponding scintillator crystal.

3. The method according to claim 1, further including:
    correcting the location of the peaks in the flood image according to the actual location of the scintillator crystals.

4. The method according to claim 3, further including:
    determining a set of deformation parameters for each partitioned region by matching the partitioned region to a template.

5. The method according to claim 4, further including:
    determining boundaries for each scintillator crystal based on the corresponding corrected location and a local minimum equidistant between adjacent Gaussian models in the model image.

6. The method according to claim 5, the step of determining boundaries for each scintillator crystal includes:
    mapping the corrected locations and the corresponding Gaussian models in the model image from an image space to a template, such as a deformation invariant rectangular space;
    determining the boundaries of each scintillator based on the mapped Gaussian models in the template; and
    mapping the template and determined boundaries back to the image space.

7. A method for nuclear imaging, comprising:
    injecting a subject positioned in an examination region of a nuclear imaging system with a radiopharmaceutical;
    detecting pairs of coincident radiation events originating from the injected radiopharmaceutical and determining projection data corresponding to the coincident pairs;
    correcting geometric distortions in the acquired projection data using the determined boundaries according to claim 5; and
    reconstructing the corrected projection data into an image representation.

8. The method according to claim 4, wherein the step of determining a set of deformation parameters for each partitioned region includes:
    generating a database of templates;
    iteratively warping each region along two dimensions to determine a translation factor, a scaling factor, and a rotation factor until the warped region matches at least one of the templates of the template database according to a least squares optimization; and
    wherein the translation factor, the scaling factor, the rotation factor, and the matched template together define the set of deformation parameters.

9. The method according to claim 3, wherein the step of determining misidentified peaks in the model image includes:
    identifying split points in the model image that occur on or near an interface between two adjacent nuclear sensors, the split point occurring when two or more nuclear sensors detect the same radiation event resulting in two or more peaks occurring in close proximity to one another and corresponding to the same scintillation crystal; and
    updating the location of the local minimum equidistant between a non-split center and the closest center of the split points for the same scintillation crystal.

10. The method according to claim 1, wherein the step of determining misidentified peaks includes:
    calculating a distance between locations of adjacent Gaussian surface models in each partitioned region;
    comparing the distances to a global average distance between all adjacent peaks and/or a local average distance of neighboring Gaussian surface models;
    labeling a Gaussian surface model as misidentified if at least one distance between an adjacent does not meet a global average criteria and/or a local average criteria.

11. A crystal identification system, comprising:
    an image memory which receives a flood image which includes a plurality of peaks, each peak responsive to radiation detected by a corresponding scintillator crystal;
    a crystal identification processor configured to perform the steps of:
    partitioning the flood image into a plurality of regions, each region being masked to correspond to one of an array of nuclear detectors:
    fitting at least one Gaussian model to each peak;
    generating a model image in which the fitted Gaussian models represent the identified peaks;

determining misidentified peaks in the model image in which locations of the peaks in the flood image differ from the corresponding scintillator crystal; and correcting the location of the misidentified peaks in the flood image based on global knowledge of all peaks and local knowledge of neighboring peaks in the model image.

12. The crystal identification system according to claim 11, wherein a local maximum for each fitted Gaussian model defines the location of the corresponding scintillator crystal.

13. The crystal identification system according to claim 11, wherein the crystal identification processor is further configured to perform the step of:

correcting the location of the peaks in the flood image according to the actual location of the scintillator crystals.

14. The crystal identification system according to claim 13, wherein the crystal identification processor is further configured to perform the step of:

determining a set of deformation parameters for each partitioned region by matching the partitioned region to a template.

15. The crystal identification system according to claim 14, wherein the crystal identification processor is further configured to perform the step of:

determining boundaries for each scintillator crystal based on the corresponding corrected location and a local minimum equidistant between adjacent Gaussian models in the model image.

16. The crystal identification system according to claim 15, the step of determining boundaries for each scintillator crystal includes:

mapping the corrected locations and the corresponding Gaussian models in the model image from an image space to a template, such as a deformation invariant rectangular space;

determining the boundaries of each scintillator based on the mapped Gaussian models in the template; and mapping the template and determined boundaries back to the image space.

17. The crystal identification system according to claim 14, wherein the step of determining a set of deformation parameters for each partitioned region includes:

generating a database of templates;

iteratively warping each region along two dimensions to determine a translation factor, a scaling factor, and a rotation factor until the warped region matches at least one of the templates of the template database according to a least squares optimization; and wherein the translation factor, the scaling factor, the rotation factor, and the matched template together define the set of deformation parameters.

18. The crystal identification system according to claim 13, wherein the step of determining misidentified peaks in the model image includes:

identifying split points in the model image that occur on or near an interface between two adjacent nuclear detectors, the split points occurring when two or more nuclear detectors detect the same radiation event resulting in two or more peaks occurring in close proximity to one another and corresponding to the same scintillator crystal; and updating the location of the local minimum equidistant between a non-split center and the closest center of the split points for the same scintillation crystal.

19. The crystal identification system according to claim 11, wherein the step of determining misidentified peaks includes:

calculating a distance between locations of adjacent Gaussian surface models in each partitioned region;

comparing the distances to a global average distance between all adjacent peaks and/or a local average distance of neighboring Gaussian surface models;

labeling a Gaussian surface model as misidentified if at least one distance between an adjacent does not meet a global average criteria and/or a local average criteria.

20. A nuclear imaging system, comprising:

an array of radiation detectors oriented about an examination region to receive radiation from a radiopharmaceutical injected into a subject;

a coincidence detector which detects pairs of detected radiation events and determines projection data corresponding to the coincident pairs;

a crystal identification system which includes a crystal identification processor configured to perform the steps of:

partitioning a flood image into a plurality of regions, each region being masked to correspond to one of an array of nuclear detectors;

fitting at least one Gaussian model to each peak;

generating a model image in which the fitted Gaussian models represent the identified peaks;

determining misidentified peaks in the model image in which locations of the peaks in the flood image differ from the corresponding scintillator crystal; and correcting the location of the misidentified peaks in the flood image based on global knowledge of all peaks and local knowledge of neighboring peaks in the model image determining boundaries for each scintillator crystal based on the corresponding corrected location and a local minimum equidistant between adjacent Gaussian models in the model image;

a calibration processor which corrects geometric distortions in the acquired projection data using the determined boundaries; and a reconstruction processor which reconstructs the corrected projection data into an image representation.

* * * * *